3,769,363
OLIGOMERIZATION OF OLEFINS WITH BORON TRIFLUORIDE
James A. Brennan, Cherry Hill, N.J., assignor to Mobil Oil Corporation
No Drawing. Filed Mar. 13, 1972, Ser. No. 234,370
Int. Cl. C07c 3/18
U.S. Cl. 260—683.15 B          5 Claims

ABSTRACT OF THE DISCLOSURE

A process is provided for oligomerizing olefins, to obtain a fluid in which the trimer to tetramer and higher ratio is at least four, which comprises: contacting said olefins in a reaction zone with a carboxylic acid-promoted boron trifluoride catalyst, said carboxylic acid having at least 3 carbon atoms, in a mole ratio of promoter to olefins of from abut 0.005:1 to about 0.05:1 and at a temperature of from about 0° C., to about 20° C., in the presence of free boron trifluoride.

BACKGROUND OF THE INVENTION

(1) Field of the invention

This invention relates to the oligomerization of olefins and, in one of its aspects, relates more particularly to a reproducible process for oligomerizing olefins to obtain a product having a trimer to tetramer and higher ratio of at least four. Still more particularly, in this aspect, the invention relates to an improved process for the oligomerization of 1-olefins, or olefin fractions, for the manufacture of synthetic fluid lubricants, suitable for many industrial applications, employing boron trifluoride catalysts under conditions in which the oligomerization is so conducted that polyolefins predominating in trimer yield are obtained.

(2) Description of the prior art

As is known to those skilled in the art, boron trifluoride, per se, is a poor catalyst for polymerization or oligomerization of olefins unless it is employed in conjunction with a suitable promoter. For this purpose, the prior art has suggested, among other materials, the use of alcohol-promoted or water-promoted boron trifluoride. In this respect, polyolefins predominating in trimer yield are considered essential in order to prepare synthetic fluid lubricants especially when utilized as a base for such materials as hydraulic fluids to be used over a wide temperature range.

SUMMARY OF THE INVENTION

In accordance with the present invention a novel method is provided for conducting the oligomerization of $C_6$ to $C_{12}$ olefins, in which a relatively high trimer yield is obtained in the resulting product. Such significant oligomerization control, with improved trimer yield, is achieved by contacting the olefins in a reaction zone with a carboxylic acid-promoted boron trifluoride catalyst, in which the carboxylic acid contains at least about 3 carbon atoms, in a mole ratio of promoter to olefins of from about 0.005:1 to about 0.05:1 and at a temperature of from about 0° C. to about 20° C. in the presence of free boron trifluoride.

In carrying out the above-described oligomerization as previously indicated, a carboxylic acid having at least 3 carbon atoms per molecule is employed as a promoter for the boron trifluoride catalyst. In this respect, lower carbon-content carboxylic acids, for example, acetic acid, cannot be successfully employed because of the high melting point of the boron trifluoride adducts that are formed. Another critical feature of the novel process resides in the necessity for maintaining the oligomerization temperature not higher than about 20° C., inasmuch as it is found that at temperatures above about 20° C. the yields of the desired trimer and higher oligomers are low and substantial amounts of carbonyl are incorporated into the oligomers thus impairing their usefulness.

As previously indicated, the oligomerization is carried out in a carboxylic acid promoter to olefin mole ratio of from about 0.005:1 to about 0.05:1 within the aforementioned range of from about 0° C. to about 20° C. In preferred applications, the oligomerization is carried out in a carboxylic acid promoter to olefin mole ratio of from about 0.005:1 to about 0.015:1, and at a temperature of from about 5° C. to about 15° C. In a still further preferred modification, the oligomerization process is so conducted that free monomer and dimer are first removed from the oligomerized olefin product by distillation and the remaining product thus obtained is then subjected to hydrogenation.

DESCRIPTION OF SPECIFIC EMBODIMENTS

The carboxylic acids suitable for use in this novel process may be illustrated by the following examples. Boron trifluoride is bubbled into a mixture of valeric acids until one molar equivalent of the halide is absorbed. The formation of the equimolar adduct is found to be highly exothermic and requires strong cooling. The temperature during this preparation is held below 50° C. The resulting promoter solution, $C_5H_{10}O_2 \cdot BF_3$ (Example 1 of Table 1), is then progressively cooled with stirring and its freezing point determined as being less than —70° C. In Examples 2–9 (Table 1) other carboxylic acids were substituted for the mixed valeric acids and in experiments entirely similar to the above the freezing point of the adduct was determined as shown in Table 1. The adduct of acetic acid $C_2H_4O_2 \cdot BF_3$ has a freeze point of 27° C. (Example 2) and is excluded from use in this process. All of the other acids formed adducts which are liquid over the temperature range of 0–20° C. and may be used in this process.

The following examples and associated data will serve to illustrate the novel improved process of the present invention for the oligomerization of olefins, to obtain products in which the trimer to tetramer and higher ratio is at least four, employing carboxylic acid-promoted boron trifluoride catalysts in which the carboxylic acid has at least 3 carbon atoms and in the aforementioned mole ratio of promoter to olefins of from about 0.005:1 to about 0.05:1 and at temperatures from about 0° C. to about 20° C., in the presence of free boron trifluoride.

The novel process of the present invention can be illustrated by the following catalyzed oligomerization of 1-decene employing boron trifluoride catalysts in conjunction with mixed valeric acids as a promoter for the purpose of obtaining a polyolefin product of predominantly increased trimer yield.

TABLE 1.—FREEZE POINTS OF BORON TRIFLUORIDE-CARBOXYLIC ACID EQUIMOLAR ADDUCTS

| BF₃ adducts of— | Freeze point, ° C. |
|---|---|
| Example number: | |
| 1 ............... Mixed valeric acids ............... | <−70 |
| 2 ............... Acetic acid ............... | 27 |
| 3 ............... Propionic acid ............... | −3 |
| 4 ............... Isobutyric acid ............... | <−40 |
| 5 ............... Valeric acid ............... | −20 |
| 6 ............... Isovaleric acid ............... | <−50 |
| 7 ............... DL-2-methyl butyric acid ............... | <−50 |
| 8 ............... Trimethylacetic acid ............... | −12 |
| 9 ............... Cyclohexane carboxylic acid ............... | <−40 |

The mixed valeric acids·boron trifluoride promoter (Example 1 of Table 1) and a boron trifluoride saturated 1-decene stream are metered separately and simultaneously in a ratio of 0.009 mole/100 g. (Example 10) into a clean, dry, glass-lined vessel maintained at 10° C. and pressured with boron trifluoride to 2–4" Hg. The rate of addition is determined by the cooling capacity of the equipment. The vessel is filled, held at the above temperature and pressure until about 85 percent of the decene has been converted and it is then quenched, water washed until neutral and finally distilled to remove monomer and dimer. The trimer accounts for greater than 80 percent of the $C_{30}$ plus product.

As shown in Table 2, increasing the promoter acid concentration (Example 11) results in increased monomer conversion in unit time with no effect upon either the degree of polymerization or the product quality. It will be noted from the table that the conversions at this temperature and at these promoter concentrations can be made comparable through longer hold times.

catalyst oligomerization resulted in a satisfactory improved trimer yield.

The reproducibility of the process and the shelf lives of the acid·boron trifluoride adducts are excellent. A 1-decene oligomerization with isovaleric acid adduct stored for a period of 35 days exactly duplicated the performance of the fresh adduct, as shown in the following table:

| Adduct age, days | Conv., wt. percent | Oligomer distribution | | | $C_{30}$ plus olefinic, KV, cs. | |
|---|---|---|---|---|---|---|
| | | Dimer | Trimer | Residual | 210° F. | −40° F. |
| 0 | 86.6 | 19 | 69 | 12 | 3.86 | 2,008 |
| 35 | 86.2 | 18 | 67 | 14 | 3.83 | 2,011 |

It will be understood that although the process of the present invention has been described with preferred embodiments, various modifications and adaptations thereof

TABLE 2

| Promoter·$BF_3$, mole/100 g. $C_{10}$ | Temp., °C. | Time., add | Min., hold | Conv., wt. percent | Oligomer distribution (wt. percent) | | | $C_{30}$ plus olefinic KV, cs. | | Yield, wt. percent |
|---|---|---|---|---|---|---|---|---|---|---|
| | | | | | Dimer | Trimer | Residual | 210° F. | −40° F. | |
| Example number: | | | | | | | | | | |
| 10 ... 0.009 mixed valerics | 10 | 74 | 60 | 66 | 20 | 68 | 12 | | | |
| | | | 240 | 83 | 21 | 66 | 13 | 3.8 | 2,012 | 65.5 |
| 11 ... 0.014 mixed valerics | 10 | 66 | 60 | 87 | 19 | 69 | 12 | 3.8 | 2,008 | 70.4 |
| 12 ... do | 30 | 66 | 60 | 61 | 45 | 52 | 3 | 3.7 | 1,751 | 33.5 |
| 13 ... do | −10 | 66 | 60 | 92 | 7 | 56 | 37 | 4.4 | 2,905 | 85.5 |
| 14 ... 0.009 water | 15 | 44 | 60 | 97 | 4 | 35 | 61 | 5.6 | 5,546 | 93.6 |
| 15 ... 0.008 ethanol | 15 | 46 | 60 | 54 | 11 | 38 | 51 | 5.2 | 4,741 | 48.0 |
| 16 ... 0.01 acetic acid | 15 | 48 | 120 | 24 | 43 | 47 | 10 | | | 13.6 |
| 17 ... 0.013 propionic acid (34) | 10 | 49 | 60 | 76 | 22 | 68 | 11 | 3.7 | 1,780 | 60.0 |

In contrast with water and alcohol promoted oligomerizations, reactions with the $C_3$ and higher carboxylic acids of the present process result in decreasing decene conversions with increasing temperatures. The average decene conversion is found to be 87 percent at 10° C. (Example 11) but only 60 percent at 30° C. (Example 12). Significantly, it is found that the once-through yield of $C_{30}$ and higher olefins is 70 percent at 10° C. (Example 11) but only 34 percent at 30° C. (Example 12). The decrease in conversion with increasing reaction temperature is attributed to consumption of the promoter via ester formation, which is favored at high temperature. In general, therefore, oligomerization temperatures greater than about 20° C. result in low olefin conversion and hence in trimer yield, while temperatures below 0° C. result in unsatisfactory viscosities for many applications (Example 13), because of the relatively low trimer to tetramer and higher ratios.

For comparative purposes, a series of olefin oligomerizations were conducted but employing, individually, water (Example 14), alcohol (Example 15), acetic acid (Example 16), and propionic acid (Example 17) promoted boron trifluoride catalysts at temperatures as shown in the above Table 1. From the comparative data thus obtained, it will be apparent that the water-promoted (Example 14) and alcohol-promoted (Example 15) boron trifluoride catalyst oligomerization resulted in relatively low trimer yield. It was necessary to heat trace the lines in order to deliver the acetic acid·boron trifluoride adduct to the reactor (Example 16). Even so, as the adduct (f.p. 27°) came in contact with the reactor maintained at 15° C. it solidified and settled to the bottom of the flask. After two hours contact between liquid olefin and solid catalyst only 24 percent of the olefin was converted which resulted in a $C_{30}$ plus product yield of only 13.6 percent. On the other hand, the use of propionic (Example 17) or valeric acid promoted (Examples 10 and 11) boron trifluoride may be resorted to without departing from the spirit and scope of the invention as those skilled in the art will readily understand.

I claim:

1. A process for oligomerizing monoolefins, having from 6 to 12 carbon atoms to obtain an improved trimer yield, which comprises: contacting said olefins in a reaction zone with a carboxylic acid-promoted boron trifluoride catalyst, said carboxylic acid having, 5 carbon atoms and selected from the group consisting of valeric acid, isovaleric acid and 2-methyl butyric acid in a mole ratio of promoter to olefins of from about 0.005:1 to about 0.05:1 and at a temperature of from about 0° C. to about 20° C., in the presence of free boron trifluoride.

2. A process in accordance with claim 1 wherein said oligomerization is carried out in a promoter to olefin mole ratio of from about 0.005:1 to about 0.015:1.

3. A process in accordance with claim 1 wherein said oligomerization is carried out at a temperature from about 5° C. to about 15°C.

4. A process in accordance with claim 1 wherein olefins comprise 1-decene.

5. A process in accordance with claim 1 wherein free monomer and dimer are removed from the oligomerized olefin product by distillation and the remaining product thus obtained is subjected to hydrogenation.

References Cited
UNITED STATES PATENTS 3,382,291    5/1968    Brennan      260—683.15
3,149,178    9/1964    Hamilton et al.    260—683.9

PAUL M. COUGHLAN, JR., Primary Examiner

U.S. Cl. X.R.

252—433; 260—683.9